(No Model.)
J. A. WITMER.
VEHICLE SPRING.
No. 396,317. Patented Jan. 15, 1889.
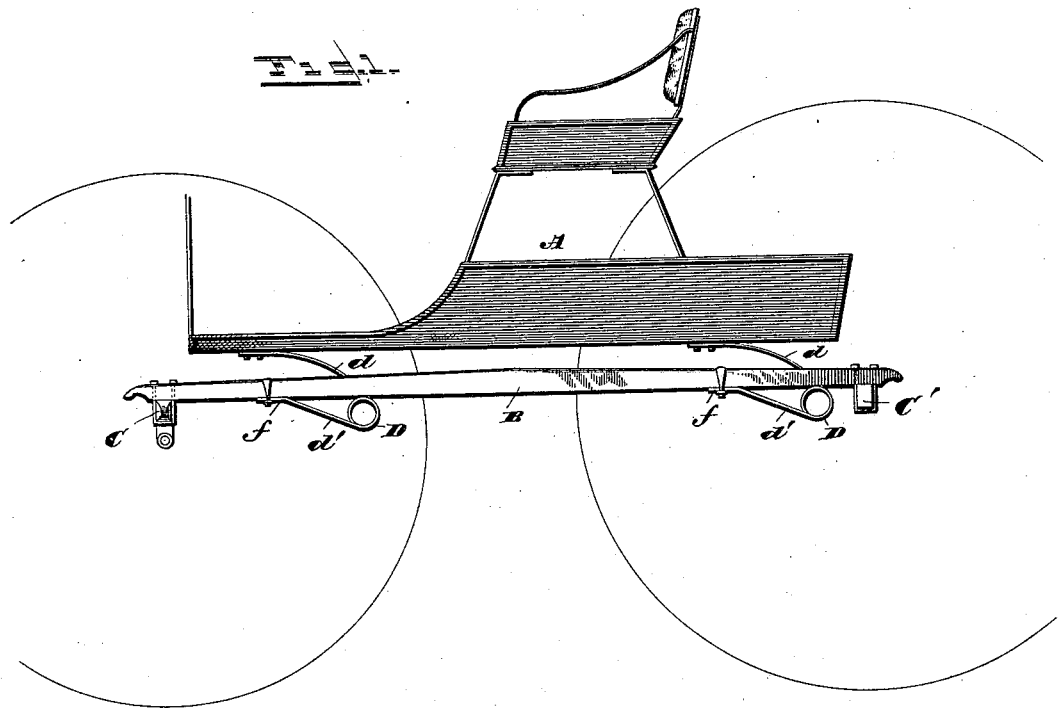
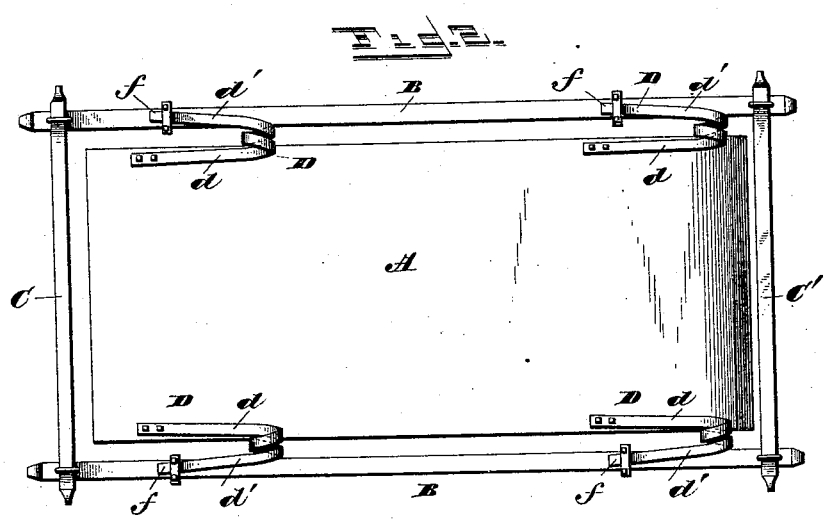
WITNESSES
G. S. Elliott
M. Johnson
John A. Witmer.
INVENTOR
by
Attorney
N. PETERS, Photo-Lithographer, Washington, D. C.

UNITED STATES PATENT OFFICE.

JOHN A. WITMER, OF WAKARUSA, INDIANA.

VEHICLE-SPRING.

SPECIFICATION forming part of Letters Patent No. 396,317, dated January 15, 1889.

Application filed November 8, 1888. Serial No. 290,313. (No model.)

*To all whom it may concern:*

Be it known that I, JOHN A. WITMER, a citizen of the United States of America, residing at Wakarusa, in the county of Elkhart and State of Indiana, have invented certain new and useful Improvements in Vehicle-Springs; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in springs for side-bar vehicles; and it consists in the construction and combination of the parts, as will be hereinafter fully set forth, and specifically pointed out in the claims.

In the accompanying drawings, Figure 1 is a side view of a side-bar vehicle, showing my improved springs applied thereto. Fig. 2 is a plan view of the under side of the vehicle. Fig. 3 is a detail perspective view of one of my springs detached.

A refers to the body of the vehicle, B the side bars, and C C' the front and rear cross-bars, to which the said side bars are secured, these parts being of ordinary construction.

D refers to my improved side torsional springs, which are made of a single piece of flat steel coiled centrally and provided with extending arms $d$ and $d'$, the arm $d$ being curved, while the lower arm, $d'$, is straight, and near its end bent to form a horizontal portion, $f$, which is clipped to the side bars, B. The upper curved arm, $d$, of the spring is bolted to the vehicle-body.

In attaching my improved springs to a vehicle they are secured to the body and side bars so that the arms $d$ and $d'$ will extend forwardly toward the line of draft, so that when the movement of the horse is imparted to the running-gear it will not affect the body, as the body will be permitted to have a slight spring movement rearwardly, the weight of the occupant slightly depressing the springs.

It will be observed that the body is permitted to be depressed without overcoming or lessening the rear movement of the body with the springs.

It is well known that in riding in vehicles the jolts and jars in passing over obstructions have a tendency to produce a swaying motion to the body, which is completely overcome by the employment of my improved springs when attached to a vehicle, as hereinbefore described.

The springs D, being made of flat spring metal, will overcome the side or swaying movement, as placing the greatest quantity of metal laterally obviates the objection to coil or torsional springs.

I am aware that prior to my invention vehicle-springs made of flat metal having their ends bent to extend in opposite directions have been secured to a vehicle to extend laterally; also, that coiled springs made of round bars of metal have been employed and attached to a vehicle so that the ends which extend from the coils would extend rearwardly, or in an opposite direction from the line of draft, and I do not claim such as my invention, as such springs are not effective, nor do they operate the same as my invention.

What I claim, and desire to secure by Letters Patent, is—

1. In combination with a side-bar vehicle, the springs D, coiled centrally and provided with forwardly-projecting arms which are attached to the under side of the body and to the side bars, so that the arms will extend in the line of draft, substantially as shown, and for the purpose set forth.

2. The combination, in a side-bar vehicle, of the springs D, having a curved upper arm, $d$, coils $e$, and a straight lower arm, $d'$, with a horizontally-bent end, $f$, said arms diverging from the coils, substantially as shown.

3. The combination, in a side-bar vehicle, of the coiled springs D D D D, having forwardly-projecting and laterally-diverging arms attached to the under side of the vehicle-body and to the under side of the side bars, the coils of said springs being located rear of the points of attachment to the body and side bars, substantially as shown, and for the purpose set forth.

In testimony whereof I affix my signature in presence of two witnesses.

JOHN A. WITMER.

Witnesses:
AARON S. ZOOK,
ISAAC A. SIMMONS.